United States Patent
Fendt et al.

(10) Patent No.: US 7,033,024 B2
(45) Date of Patent: Apr. 25, 2006

(54) METHOD FOR MANUFACTURING AN EYEGLASS LENS

(75) Inventors: Roswitha Fendt, Ottobrunn (DE); Fritz Gruna, Muehldorf (DE); Helmut Altheimer, Lauchdorf (DE); Walter Haimerl, Munich (DE); Gregor Esser, Munich (DE); Herbert Pfeiffer, Munich (DE)

(73) Assignee: Rodenstock GmbH, Munich (DE)

( * ) Notice: Subject to any disclaimer, the term of this patent is extended or adjusted under 35 U.S.C. 154(b) by 0 days.

(21) Appl. No.: 10/470,082

(22) PCT Filed: Jan. 24, 2002

(86) PCT No.: PCT/DE02/00237

§ 371 (c)(1),
(2), (4) Date: Dec. 24, 2003

(87) PCT Pub. No.: WO02/059682

PCT Pub. Date: Aug. 1, 2002

(65) Prior Publication Data

US 2004/0085650 A1    May 6, 2004

(30) Foreign Application Priority Data

Jan. 24, 2001  (DE) ................................ 101 03 113

(51) Int. Cl.
*G02C 7/02* (2006.01)
(52) U.S. Cl. ..................................................... 351/177
(58) Field of Classification Search ................ 351/177, 351/168–172
See application file for complete search history.

(56) References Cited

U.S. PATENT DOCUMENTS

| 3,740,857 | A | * | 6/1973 | Nerad ......................... 33/507 |
| 4,980,993 | A |   | 1/1991 | Umezaki |
| 5,790,232 | A | * | 8/1998 | Hagiwara et al. ........... 351/177 |
| 5,992,998 | A |   | 11/1999 | Pfeiffer et al. |
| 6,382,789 | B1 | * | 5/2002 | Baudart et al. ............. 351/177 |
| 6,637,880 | B1 | * | 10/2003 | Yamakaji et al. ........... 351/177 |
| 2002/0176049 | A1 | * | 11/2002 | Sakai et al. ................. 351/177 |

FOREIGN PATENT DOCUMENTS

| DE | 4337369 | 5/1995 |
| EP | 0 359 084 | 3/1990 |
| JP | 1075149 | 3/1989 |

OTHER PUBLICATIONS

Patent Abstracts of Japan, vol. 013, No. 281 (M-842) (abstract of JP 01-075149), Jun. 1989.

* cited by examiner

*Primary Examiner*—Scott J. Sugarman
*Assistant Examiner*—Darryl J. Collins
(74) *Attorney, Agent, or Firm*—Crowell & Moring LLP

(57) ABSTRACT

A method for manufacturing a spectacle lens, in which at first a semi-finished uncut spectacle lens (hereinafter referred to as a blank) is produced, i.e. a spectacle lens having merely one finished optical surface (hereinafter described as base surface); subsequently a prescription-optimized surface is computed according to the data of a spectacle lens prescription; and then the prescription-optimized surface is finished according to the computed data. The invention is characterized by the following method steps: after the production of the semi-finished spectacle lens the base surface is measured; the prescription-optimized surface is computed and finished taking into account not only the individual data of the spectacle prescription, but also the actual shape of the base surface.

20 Claims, 3 Drawing Sheets

Sph 0.5 Add 2.0

Front surface: theoretical spherical surface.
Prescription-optimized surface: progressive-atoroidal
surface optimized for the theoretical base surface.

Visus Distribution

Sph 0.5 Add 2.0

Front surface: fabricated spherical surface having deviations approaching a tolerance limit.
Prescription-optimized surface: progressive-atoroidal surface optimized for the theoretical base surface.

Visus distribution

Sph 0.5 Add 2.0

Front surface: fabricated spherical surface having deviations approaching a tolerance limit.
Prescription-optimized surface: progressive-atoroidal surface optimized for the fabricated and measured base surface.

Visus distribution

METHOD FOR MANUFACTURING AN EYEGLASS LENS

TECHNICAL FIELD

The invention relates to a method of manufacturing a spectacle lens, as set out in the preamble of patent claim 1.

STATE OF THE ART

Apart from very few exceptions—e.g. directly casting a spectacle lens finished on both sides—at present the manufacture of a spectacle lens for correcting eye defects is performed as follows:

At first, a semi-finished and uncut spectacle lens which, for example, is round and unedged is fabricated. A spectacle lens of this kind, having merely one finished optical surface which hereunder is designated as a base surface, and one as yet unfinished second surface, is designated also as a blank (see ISO Standard 10322). This blank which represents a—commercially available—semi-finished product is fabricated either "as stock" or at short notice because of a definite order, or is purchased by a manufacturer of a prescription-optimized surface from another manufacturer. This kind of purchase is not uncommon in so-called decentralized fabrication in which use is made of prescription-lens workshops.

As soon as a definite order, based on a spectacle lens prescription, is received by a manufacturer of prescription-optimized surfaces, a prescription-optimized surface is computed, or a "fitting" prescription surface is selected from available previously computed prescription surfaces, in accordance with the data of the particular spectacle prescription. This prescription surface is then fabricated according to the computed or selected previously computed data.

Because the fabrication machinery of so-called "prescription-lens fabricating works" is designed for processing concave and therewith eye-side surfaces as an rule the front surface is chosen to be the base surface. A prescription-optimized surface or selected prescription surface is therefore (as a rule) a concave eye-side surface.

Until recently, in practice the surface which is more complicated to produce was predominantly chosen to be the base surface, i.e. the progressive surface for a progressive spectacle lens, or the toroidal or atoroidal surface for a single-vision lens with astigmatic power.

For example, in the case of progressive spectacle lenses, from several 10 to more than 100 different progressive front surfaces, differing from each other in surface power at the distance reference point (base curve) and addition power (increase of power from the distance portion to the near portion), were computed (in advance, i.e. irrespective of any individual wearing position) and fabricated as blanks (on stock). To conform a blank to a given spectacle prescription, a concave eye-side surface was then produced on the semi-finished spectacle lens provided with the progressive front surface. For this, the choice of the eye-side surface was made so that the spherical power stipulated by the spectacles prescription was achieved by the values of spherical surface power of the front surface and the eye-side surface (prescription surface). In the case of an additional astigmatic power, instead of a spherical or aspherical eye-side surface a toroidal or atoroidal surface was fabricated, the cylinder power and cylinder axis of which corresponded to the respective prescription values.

Furthermore, it is known to combine a base surface which is designed as a progressive surface and which is also the front surface with an aspherical or atoroidal eye-side surface which has been computed specially for a specific wearing situation, i.e. for the individual conditions of a particular spectacles wearer. Concerning this, attention is drawn to DE 42 10 008 A1 or DE 195 11 613 A1, or to the spectacle lenses manufactured by Optische Werke G. Rodenstock, Munich, DE, which are designated "Multigressive (II)" and have been in prior public use.

However, in the patent literature it has already been proposed for some time that the surface which is more complicated to produce, for example a progressive surface, be selected as the prescription-optimized surface and designed, for example, in such manner that it additionally also has an astigmatic power according to the spectacles prescription concerned. Concerning this, attention is drawn to U.S. Pat. No. 2,878,721 or DE 43 37 369 A1. A proposal similar to that of the two publications mentioned above is also contained in DE 197 01 312 A1 and also other patent applications. According to these applications, the front surface serving as base surface is a rotationally symmetrical and, in particular, a spherical surface.

A spectacle lens based on DE 43 37 369 A1 has been manufactured and marketed under the trade name "Impression" or "ILT" by the firm of Optische Werke G Rodenstock, Munich, DE, since May 2000: with this spectacle lens the prescription-optimized surface is the eye-side surface which is designed to be progressive and has been computed according to prescription values as well as individual data of the spectacles wearer concerned (interpupillary distance, vertex distance, pantoscopic angle and further individual data) and also, as the case may be, a chosen spectacles frame. A spherical, aspherical, or atoroidal front surface is used as a base surface, the atorus (as a rule) serving only for an aesthetic matching of the front surface to the shape of the lens rims of a chosen spectacle frame and not for correction of any astigmatism of an eye.

The wording of the preamble of patent claim 1 sets out from this spectacle lens, or the method applied in manufacturing this spectacle lens.

Furthermore, reference is expressly made to the above-mentioned publications and spectacle lenses in prior public use for an explanation of all details not described here more closely.

Now the fabrication of spectacle lenses is beset with defects of fabrication—as is any fabrication. In the manufacture of rotationally symmetrical (single power) spectacle lens surfaces, or toroidal or progressive surfaces, the manufacturers of blanks as a rule do not produce a particular finished face of a blank with the highest possible precision that would be usual, for example, with lenses for precision optical systems such as photographic objective lenses, but for reasons of cost (only) with markedly lower precision. The deviations of surface power value and surface astigmatism occurring with commercially available semi-finished products are—as has been found according to the invention—frequently even greater than the values permissible according to ISO Standard 10322:

According to ISO 10322, for single power spectacle lenses having spherical surfaces and a vertex surface power between 2 and 10 dpt, the maximum spherical deviation from the vertex power, and also the maximum surface astigmatism at every point of the surface, is of an amount up to ±0.06 dpt. With progressive surfaces, the spherical and astigmatic deviations from stipulated values may be even greater. For blanks, in particular of a highly refracting plastics material, surface astigmatism values of up to 0.25 dpt resulting from distortion effects and the like can be found on the periphery, the occurrence of distortion phenomena and the resulting surface astigmatism being subject to statistical fluctuations.

In JP 10-175 149 A it has therefore been proposed to select, for finished base surfaces which are the surfaces more complicated to produce, such as progressive surfaces, suitable eye-side surfaces following a merely "cursory" measurement.

A similar manner of proceeding has been described for contact lenses in U.S. Pat. No. 4,980,993.

However, none of the two aforementioned publications describe spectacle lenses for which a prescription-optimized surface is individually computed with the respective data of a spectacles wearer, and for which the computation is modified on the basis of the measurements. Both of these publications therefore describe other methods than the one specified by the preamble of patent claim 1.

DESCRIPTION OF THE INVENTION

In accordance with the invention it has been realized that even the typically occurring and apparently small deviations of spectacle lens surfaces from the stipulated values must in no way be neglected, and that they may have a not insignificant effect, for example on the so-called visus. This, of course, is even more the case when the actual deviations are greater than the deviations admissible according to ISO 10322, and attain values of 0.25 dpt and even more.

"Visus" designates the reciprocal of the angular acuity of vision; the angular acuity of vision being the smallest angle which can be resolved by an eye. The visus thus represents a measure of the power of vision achieved by a spectacles wearer on the basis of the system "spectacle-lens/eye". Concerning the relationship between the value of the visus and the properties of a spectacles lens, attention is drawn to "Forschungsbericht Visus" ("Research Report Visus") of the Institute for Medical Optics of the University of Munich, to which furthermore reference is expressly made concerning an explanation of the term "visus" used here and all other details.

The invention is based on the object of developing further a method for manufacturing a spectacle lens, in which first a semi-finished and uncut spectacle lens is fabricated, subsequently the prescription optimized surface is computed in accordance with the data of a spectacles lens prescription, and then the prescription-optimized surface is finished according to the computed data, in such manner that the visus achieved with the finished spectacle lens for the system spectacle-lens/eye is not impaired by fabrication-caused properties of the base surface.

An achievement of this object is set out in patent claim 1. Further developments of the invention are the subject matter of claim 2 and those following.

In accordance with the invention it has been realized that even "apparently" small defects of fabrication, such as occur in prior art with spherical or simple toroidal front surfaces of semi-finished spectacle lenses, have an unexpectedly large effect on the visus, especially when the prescription-optimized surface is an individually computed progressive surface. Particularly with cast blanks, these fabrication defects can nullify the advantages which individual computation has for the visus.

According to the invention a method of the generic kind is therefore further developed in such manner that following the production of a semi-finished spectacle lens the base surface is measured. The prescription-optimized surface is computed by taking into account not only the data of the prescription, but also by taking into account the actual shape of the base surface, i.e. particularly the deviations of the actual values of the base surface from the theoretically desired values—which means that it is not selected from given surfaces—and it is then finished. With this manner of proceeding there is obtained, on the basis of the prescription-optimized surface which has been changed—in accordance with the physical deviations—, an actual shape of the contours of equal visus, as obtained theoretically by computing the surface using the theoretical values of the base surface, even when the base surface actually present on the blank seriously deviates from the (stipulated) theoretical base surface, The method of the invention is of advantage particularly when the prescription-optimized surface is computed by taking into account not only the basic optical data of a spectacles wearer (spherical power, astigmatism, cylinder axis of the astigmatism), but taking into account also the individual data (interpupillary distance, vertex distance, pantoscopic angle etc.), and possibly also, as the case may be, the shape of the rims of a chosen spectacles frame. In this case, a new computation of the prescription-optimized surface is always necessary for the fabrication of each spectacle lens, so that an additional outlay for the manufacture of the spectacle lens of the invention is limited to a measurement of the base surface.

This manner of proceeding is cheaper than a fabrication of a base surface with appropriately greater accuracy than is at present customary in spectacle optics.

In principle the following combinations of base surface and prescription-optimized surface are possible:

| Progressive Power Lenses | | |
|---|---|---|
| | Base Surface | Prescription-Optimized Surface |
| 1. | Progressive Surface | Rotationally Symmetrical Asphere or Atorus |
| 2. | Sphere | Progressive-Atoroidal |
| 3. | Torus | Progressive-Atoroidal |
| 4. | Progressive Surface | Progressive-Atoroidal |

Within the scope of the present application a progressive surface is understood to be an aspheric surface which provides a significant contribution to the power increase of a spectacle lens. An atoroidal surface is understood to be an aspherical surface having one, two or no axes of symmetry, which provides no significant contribution to the power increase of the whole spectacle lens, and frequently, but not necessarily, provides a contribution to the correction of an astigmatism of an eye. A progressive-atoroidal surface is understood to be a surface which with astigmatic prescriptions provides a substantial contribution both to the power increase and to the astigmatic power of the spectacle lens. In the case of a spherical prescription, the progressive-atoroidal surface in principle corresponds to a progressive surface, however in any case all possible parameters such as, for example, vertex distance, interpupillary distance etc. are taken into account in the computation of the progressive surface.

| Single Power Lenses | | |
|---|---|---|
| | Base Surface | Prescription-Optimized Surface |
| 1. | Rotationally Symmetrical Asphere or Atorus | Rotationally Symmetrical Asphere or Atorus |
| 2. | Sphere | Rotationally Symmetrical Asphere or Atorus |
| 3. | Torus | Rotationally Symmetrical Asphere or Atorus |

The method of the invention is however specially preferred for spectacle lenses in which the prescription-optimized surface is a progressive surface, i.e. a surface, the power of which in the wearing position changes between at least two regions. In accordance with the invention it has been found that for surfaces of this kind, small deviations of the actually present base surface from an ideal base surface stipulated in the computation of the progressive surface already lead to a considerable reduction of the visus. This applies particularly when the progressive surface also provides any astigmatic power which may be required in accordance with an individual spectacles prescription; in this case as a rule the progressive surface is computed "on demand" when a definite order is received, so that—as has already been explained—any additional outlay is restricted to a measurement of the (frequently, but in no way absolutely necessary) spherical base surface.

However, it is also possible for the prescription-optimized surface to be an atoroidal surface having two, one or no axes or planes of symmetry. In many cases however, even then the base surface will have an at least approximately spherical or rotationally symmetrical aspheric shape.

In accordance with the invention the base surface which is either in stock, or fabricated in advance, or may even be purchased, is provided and measured. The measurement can be performed either point by point at the reference points, or over the entire surface, the last-mentioned method being preferred. Especially with blanks which have been produced by casting, peripheral local deviations from the desired value data may occur because of distortions which are not detected by a measurement of peak values, or by a measurement at the reference points.

The measurement and the analysis of any given physically manufactured surface is followed by a fitting of a theoretical surface to the measurement values. An individual computation and an optimization of a provided prescription-optimized surface with respect to the data of a spectacles wearer is performed by taking into account the results of measurement on the base surface. In the case of a point by point measurement it is preferred for the prescription-optimized surface to be computed by means of support positions which coincide with the measurement points.

Now, the spectacle lens provided by the invention always has the best imaging properties regardless of the quality of the base surface, because the fabrication defects of the base surface are taken into account in the computation of the prescription-optimized surface and thus compensated.

Because, as a rule, the base surface is intended to be a semi-finished product which is as inexpensive as possible, the demands made on the quality of the base surface can therefore be appreciably be lowered. A marked price-advantage is therefore obtained together with a better quality of the entire spectacle lens. However, it is not necessary for the base surface to be a semi-finished product; it must only be measured in every case before the prescription-optimized surface is computed.

Necessary for the method according to the invention is a rapid method of measurement and a rapid method of computation and optimization of the prescription-optimized surface. On modern computers an optimization of the prescription-optimized surface can be performed in less than one minute.

Methods of measurement that can be employed with the method of the invention are practically all known methods which are suitable for the measurement of surfaces of spectacle lenses. Various usable methods are described for example in the review articles "Der Einsatz moderner Messmethoden zur Entwicklung und Fertigung von Brillengläsern" (The Employment of Modern Methods of Measurement for the Development and Finishing of Spectacle Lenses") by Dr. Wolfgang Grimm, published in DOZ, December 1984, Page 41 ff., or in "Messtechnische Gesichtspunkte zu optisch anspruchsvollen Brillengläsern" (Aspects of Measurement Technique for Optically Exacting Spectacle Lenses), Dr. Günther Guilino, published in DOZ December 1988, Page 8 ff. Furthermore, an excellently suitable method for the computation method of the invention is the measurement of the base surface with a reflection measurement method. Interferometric methods are also well suited, because they detect precisely the deviations of the actual surface from the theoretically desired surface.

Apart from a general improvement of the imaging quality and a reduction of manufacturing costs, yet further advantages of the method of the invention result:

With small prescribed cylindrical powers, small errors in the reference points of the base surface become very strongly noticeable. As will yet be described in the following, with the cross cylinder method it is possible to obtain an estimate for the resulting cylindrical power from the cylindrical power of the base surface and the desired cylindrical power of the prescription-optimized surface. With this it can be seen that small astigmatic errors already lead to large rotations of the cylinder axis.

By taking into account this error which is known in ophthalmic optics in a computation of the prescription-optimized surface, this rotation of the axis can now be avoided.

SHORT DESCRIPTION OF THE DRAWINGS

In the following the invention will be described by way of example, without limitation of the general inventive concept, with reference to the drawings to which, furthermore, attention is expressly drawn concerning the disclosure of all details of the invention not described more explicitly in the text. Shown by:

DESCRIPTION OF AN EXAMPLE OF EMBODIMENT

In the following, first the various cross-cylinder methods will be described to explain the effects of small errors on surface astigmatism:

Cross Cylinder Method—Addition $$cyl_x = cyl_1 \cdot \cos(2 \cdot A_1) + cyl_2 \cdot \cos(2 \cdot A_2)$$

$$cyl_y = cyl_1 \cdot \sin(2 \cdot A_1) + cyl_2 \cdot \sin(2 \cdot A_2)$$

$$cyl_{res} = \sqrt{(cyl_x^2 + cyl_y^2)}$$

$$A_{res} = a\tan(cyl_y/cyl_x)$$

wherein

| | |
|---|---|
| $cyl_1$, $A_1$ cylinder 1: | magnitude and cylinder axis |
| $cyl_2$, $A_2$ cylinder 2: | magnitude and cylinder axis |
| $cyl_{res}$, $A_{res}$ resulting cylinder: | magnitude and cylinder axis |

It is therefore possible to stipulate the deviations at the reference points, for example for spherical, cylindrical, prismatic powers, in the computation of the prescription optimized surface.

Furthermore, it is possible to take into account an error at the position of an engraving. The semi-finished products are often provided with an engraving, based on which the finished spectacle lenses are stamp-marked and then fitted into a spectacles mount by an ophthalmologist according to the stamp-marks. A shift of these engravings thus directly affects the wearing comfort of a spectacles wearer. With the method of the invention it is now possible to compensate this error.

The quality of a spectacle lens is characterized by the spherical and astigmatic deviation. For this, a difference from a stipulated astigmatism $A_0(y)$ is best computed with the cross-cylinder method which takes into account both the magnitude and the cylinder axis.

Cross-cylinder Method—Subtraction $$cyl_x = cyl_{act} \cdot \cos(2 \cdot A_{act}) - cyl_{des} \cdot \cos(2 \cdot A_{des})$$

$$cyl_y = cyl_{act} \cdot \sin(2 \cdot A_{act}) - cyl_{des} \cdot \sin(2 \cdot A_{des})$$

$$cyl_{res} = \sqrt{(cyl_x^2 + cyl_y^2)}$$

$$A_{res} = a\tan(cyl_y/cyl_x)$$

wherein

| | |
|---|---|
| $cyl_{act}$, $A_{act}$ | actual cylinder (spectacle lens): magnitude and cylinder axis |
| $cyl_{des}$, $A_{des}$ | desired cylinder (prescription): magnitude and cylinder axis |
| $cyl_{res}$, $A_{res}$ | resulting cylinder (astigmatic defect): magnitude and cylinder axis |

The cross-cylinder method—subtraction will be explained in detail with the aid of Example 1.

EXAMPLE 1

A prescription has a spherical power of 0.5 dpt at the distance reference point, a cylindrical power of 2.5 dpt, and a cylinder axis of 0 degrees, and also an addition power of 2.0 dpt. The computed spectacle lens has a cylindrical power of 2.5 dpt at one point on the principal line, and a cylinder axis of 2 degrees at one point on the principal line. An astigmatic error of 0.174 results from this.

Figure 1:
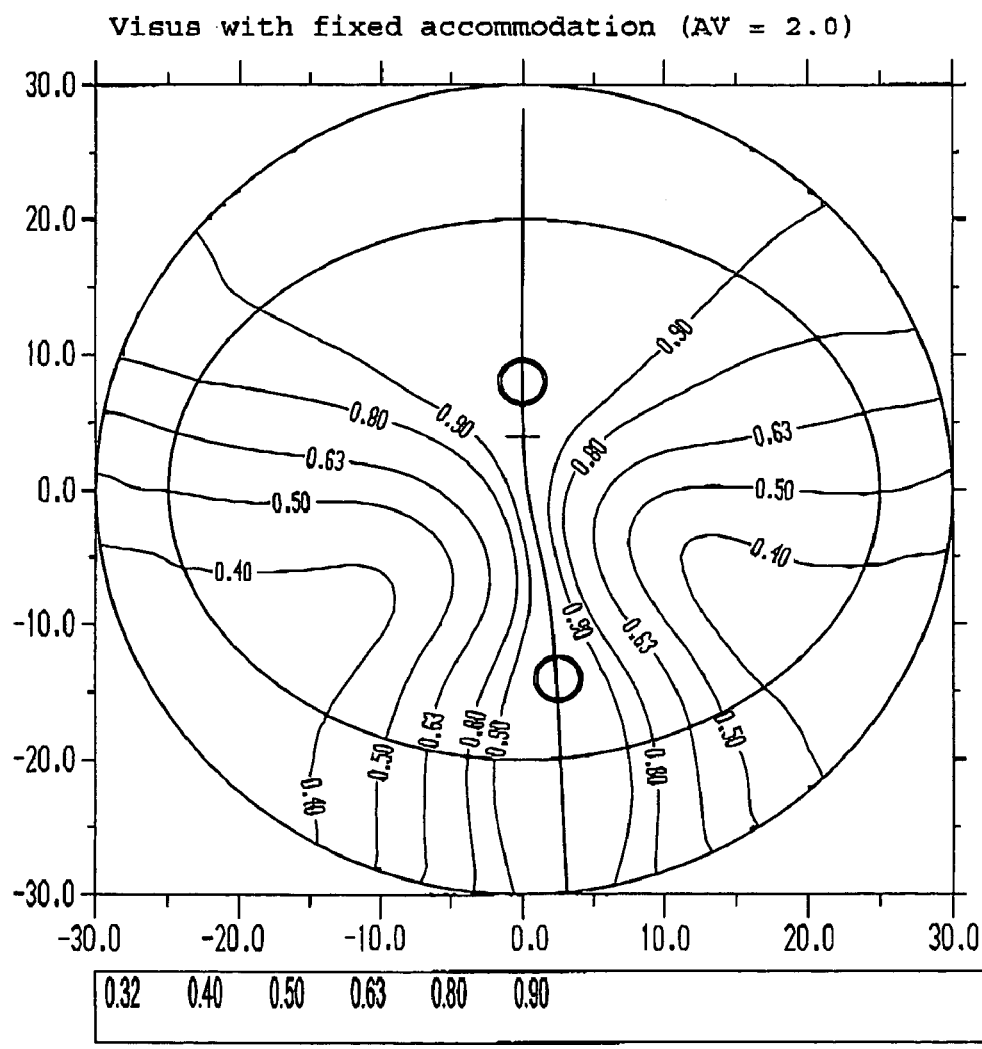
FIG. 1 are the isometric lines of the visus for a theoretical base surface and a corresponding progressive-atoroidal surface.

In the following the invention will be described in detail with reference to FIGS. 1 to 3:

FIG. 1 shows the case that a progressive-atoroidal surface is optimized for a theoretical base surface which in this case is a sphere without defects. In the example shown, the base surface which is the front surface has a power of 5.12 dpt at the vertex.

At the distance reference point which is illustrated by a circle at y=8 mm in FIG. 1, the spherical power of the spectacle lens is 0.5 dpt. The addition power, i.e. the difference of the optical powers at the distance reference point and the near reference point (circle at y≈−14 mm), is 2 dpt. The principal line winds towards the nose at least between the distance reference point and the near reference point In FIG. 1 the isometric lines of the visus—without accommodation by the spectacles wearer—are shown for an unfinished round spectacle lens having a radius of 30 mm, and a typical edged spectacle lens, a visus of 1 being the "normal case" for an eye having correct-sight, or for a "corrected" eye. It can be seen clearly that the distance portion is comparatively large, and that the visus line 0.9 extends into the periphery of the distance portion at a comparatively low level.

Figure 2:
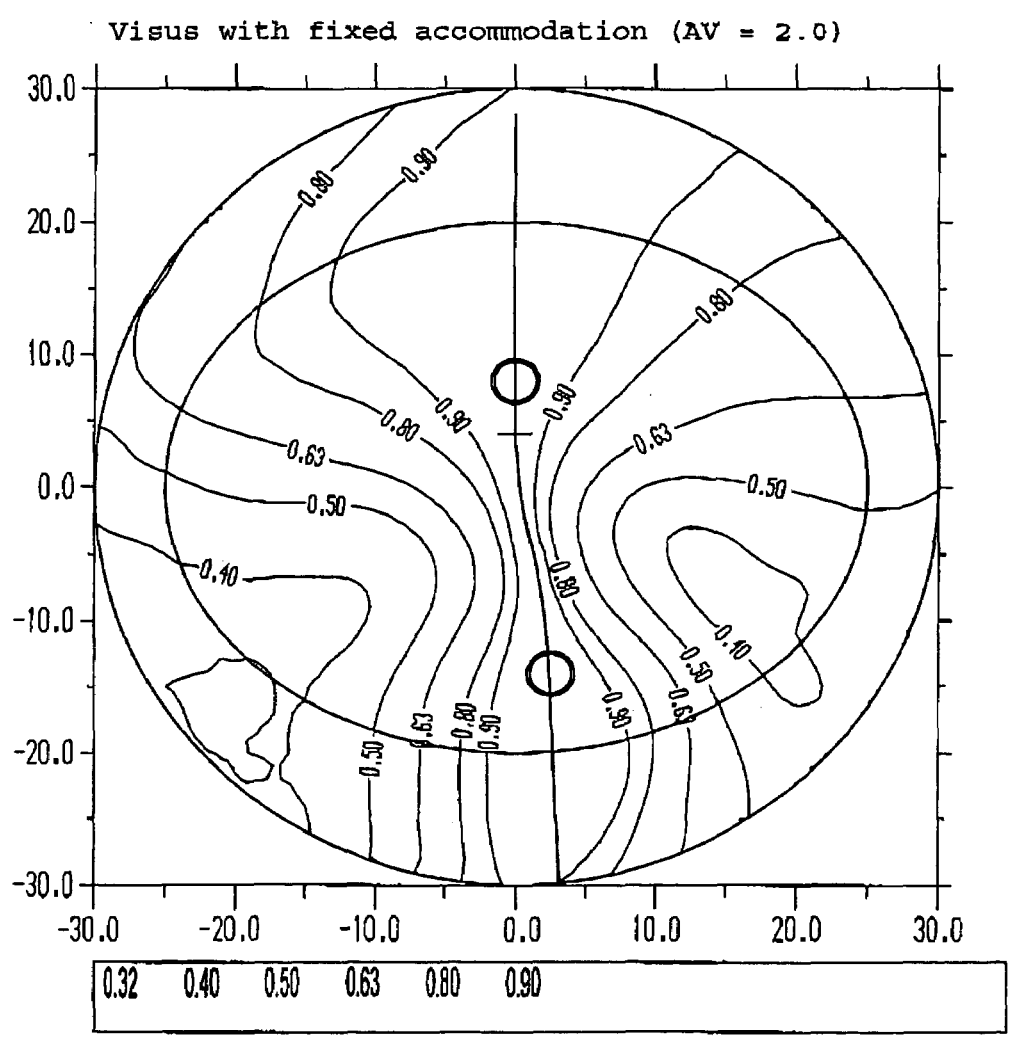
FIG. 2 are the isometric lines when the base surface is a fabricated spherical surface having deviations approaching a tolerance limit, and the prescription-optimized surface according to FIG. 1 is used.

FIG. 2 shows the case in which the front surface is not a theoretical, defect-free spherical surface, but an actually fabricated spherical surface having defects. The deviations of the spherical surface according to FIG. 2, which is used, are slightly larger than specified by ISO 10322 and correspond to the typical deviations of spherical surfaces, such as those offered cheaply by outside providers for use in finishing prescription lenses. The progressive atoroidal surface used in the example according to FIG. 1, which has been computed or optimized for the theoretical base surface, is used as the prescription-optimized surface.

It can be clearly seen that the isometric line of the visus 0.9 no longer extends into the distance portion at a level as low as in FIG. 1, but "penetrates" into the distance portion at a higher level.

Figure 3:
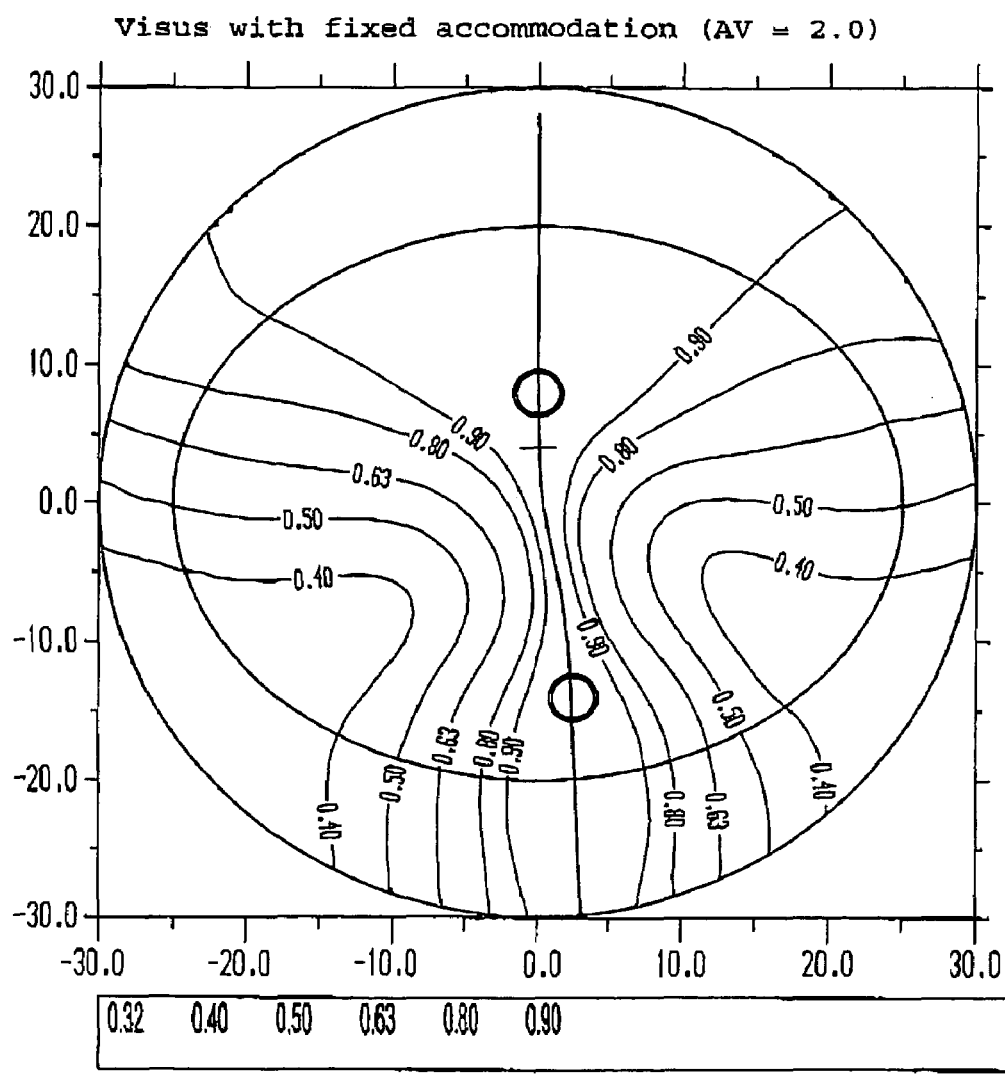
FIG. 3 are the isometric lines when the base surface according to FIG. 2 and a prescription-optimized surface computed for this base surface are used.

FIG. 3 shows an example of embodiment of the invention in which the base surface is the fabricated spherical surface according to FIG. 2, having deviations approaching the tolerance limit. Again, the prescription-optimized surface is a progressive atoroidal surface which however has been specially optimized for the base surface actually used and measured before the optimization. The isometric lines of the visus extend exactly as in the "ideal case" according to FIG. 1; in particular, the isometric line of the visus 0.9 extends exactly at just as low a level as with the purely theoretical example according to FIG. 1.

With this it has surprisingly been found that the tolerances of a fabricated progressive-atoroidal surface which has been computed for a physical base surface beset with defects, do not have as large an effect on the visus as the tolerances of the base surface. Thus in practice a spectacle lens which has been substantially improved in comparison with prior art is obtained by matching the progressive-atoroidal surface or, in general, the prescription-optimized surface to a physical and measured base surface. This manner of proceeding is less costly than initially fabricating the base surface as exactly as possible, especially when a whole-surface and rapid measurement of the base surface is performed. Furthermore, a combination of a measured base surface and a matching prescription-optimized surface is more tolerant of errors than a combination of a base surface which has been fabricated as exactly as possible and a theoretically prescription-optimized surface.

The invention has been described above with the aid of an example of embodiment without limitation of the general inventive concept which may be derived from the present application and the claims.

The invention claimed is:

1. Method for manufacturing a spectacle lens, in which initially a semi-finished uncut spectacle lens or blank is produced, including a spectacle lens having merely one finished optical surface or base surface;

subsequently a prescription-optimized surface is computed according to data of a spectacle lens prescription; and then the prescription-optimized surface is finished according to the computed data;

wherein:

after production of the semi-finished spectacle lens the base surface is measured;

the prescription-optimized surface is computed and finished taking into account individual data of the spectacles prescription, wherein the computed prescription-optimized surface takes into account deviations of actual values of sagittal heights of the base surface from theoretical desired values.

2. Method according to claim 1, characterized in that the deviations of actual values of sagittal heights of the base surface from theoretical desired values taken into account are deviations present on the entire surface.

3. Method according to claim 2, characterized in that the prescription-optimized surface is computed taking into account no only basic optical data of the spectacles prescription (spherical power, astigmatism, cylinder axis of the astigmatism), but also taking into account individual data (interpupillary distance, vertex distance, pantoscopic angle etc.) of a spectacles wearer and possibly also, as the case may be, a shape of lens rims of a chosen frame.

4. Method according to claim 3, characterized in that the prescription-optimized surface is a progressive surface, i.e. a surface, a power of which in the wearing position changes between at least two regions.

5. Method according to claim 4, characterized in that the progressive surface also provides any astigmatic power which is necessary according to the individual lens prescription.

6. Method according to claim 5, characterized in that the prescription-optimized surface is an atoroidal surface.

7. Method according to claim 6, characterized in that the base surface is a rotationally symmetrical surface or an atoroidal surface, a shape of which has been chosen for aesthetic reasons for matching the shape of lens rims, and an astigmatic power of which, as a rule, does not serve to compensate any astigmatism of an eye.

8. Method according to claim 6, characterized in that both the base surface and the prescription-optimized surface are progressive surfaces.

9. Method according to claim 1, characterized in that the prescription-optimized surface is computed taking into account not only basic optical data of the spectacles prescription (spherical power, astigmatism, cylinder axis of the astigmatism), but also taking into account individual data (interpupillary distance, vertex distance, pantoscopic angle etc.) of a spectacles wearer and possibly also, as the case may be, a shape of lens rims of a chosen frame.

10. Method according to claim 9, characterized in that the prescription-optimized surface is a progressive surface, i.e. a surface, a power of which in the wearing position changes between at least two regions.

11. Method according to claim 10, characterized in that the progressive surface also provides any astigmatic power which is necessary according to the individual lens prescription.

12. Method according to claim 9, characterized in that the prescription-optimized surface is an atoroidal surface.

13. Method according to claim 1, characterized in that the base surface is a rotationally symmetrical surface or an atoroidal surface, a shape of which has been chosen for aesthetic reasons for matching the shape of lens rims, and an astigmatic power of which, as a rule, does not serve to compensate any astigmatism of an eye.

14. Method according to claim 13, characterized in that the base surface has an at least approximately spherical shape.

15. Method according to claim 1, characterized in that both the base surface and the prescription-optimized surface are progressive surfaces.

16. Method according to claim 15, characterized in that the measurement of the base surface is made point by point.

17. Method according to claim 15, characterized in that the measurement of the base surface is performed with an interferometric or reflective method.

18. Method according to claim 15, characterized in that the measurement of the base surface is made point by point.

19. Method according to claim 18, characterized in that a theoretical surface which is used for computing the prescription-optimized surface is derived from measured points.

20. Method according to claim 18, characterized in that the prescription-optimized surface is measured by means of support points which coincide with the measured points.

* * * * *